R. PFEFFER.
COOKING UTENSIL.
APPLICATION FILED NOV. 4, 1919.
1,348,048.
Patented July 27, 1920.
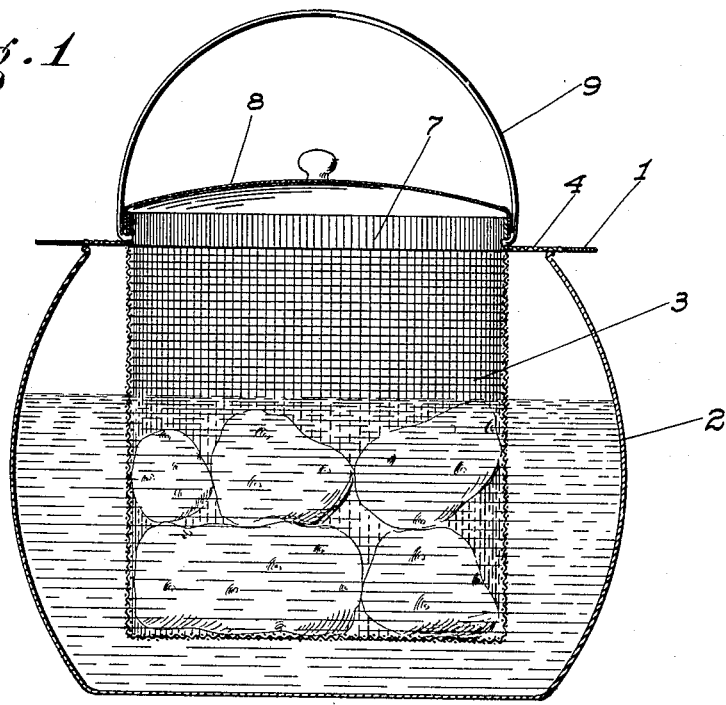
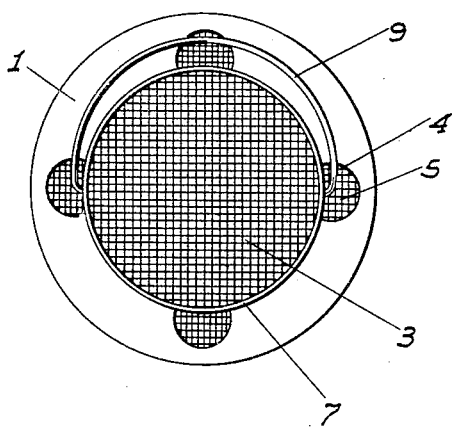
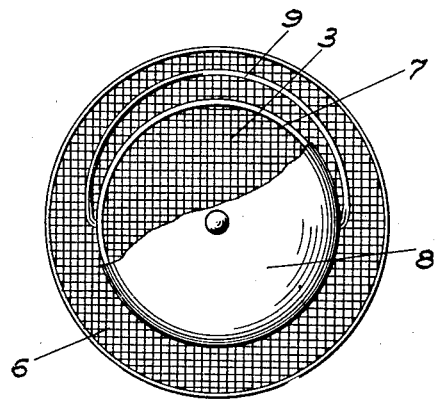
INVENTOR.
Rose Pfeffer
BY
ATTORNEY

UNITED STATES PATENT OFFICE.

ROSE PFEFFER, OF SAN JOSE, CALIFORNIA.

COOKING UTENSIL.

1,348,048.         Specification of Letters Patent.     Patented July 27, 1920.

Application filed November 4, 1919. Serial No. 335,656.

*To all whom it may concern:*

Be it known that I, ROSE PFEFFER, a citizen of the United States, residing at San Jose, county of Santa Clara, State of California, have invented certain new and useful Improvements in Cooking Utensils; and I do declare the following to be a full, clear, and exact description of the same, reference being had to the accompanying drawings, and to the characters of reference marked thereon, which form a part of this application.

This invention relates to improvements in cooking utensils of a type adaptable for use in any household to cook all kinds of meats, fish, vegetables, cereals, fruits, etc., therein, or in fact any kind of food which is firm in texture and not inclined to run, or turn to liquid.

The principal object of my improved cooker is to provide a utensil in which the food to be cooked may be placed, so constructed that the contents will never burn, and hence do not need to be stirred to prevent sticking; cannot boil over, and which may be left on the fire without attention for the entire time necessary for their cooking.

Also, when cooked, the food may be easily and completely drained of all water without the danger of being burnt by steam while so doing, or of spilling the contents, as is frequently the case with cooking utensils of the type at present in use.

Because of the foregoing advantages, the housewife will have no burned pots to scrub, no burned food to throw away, and it will enable her to do other things while the food is cooking since the cooker does not require watching.

It thus combines the advantages of a double boiler, such as is frequently used, but eliminates the slowness of cooking had with such utensils.

Another object of the invention is to produce a simple and inexpensive device, and yet one which will be exceedingly effective for the purposes for which it is designed.

These objects I accomplish by means of such structure and relative arrangement of parts as will fully appear by a perusal of the following specification and claim.

On the drawings similar characters of reference indicate corresponding parts in the several views.

Figure 1 is a vertical section of my improved cooker, showing the same inserted into an ordinary cooking kettle or pot.

Fig. 2 is a top plan view of the same, with the cover removed.

Fig. 3 is a similar view, showing a modified form of the outer rim.

Referring now more particularly to the characters of reference on the drawings, the numeral 1 denotes a horizontal metal band or rim adapted to rest on the edge of any kind of cooking pot or kettle 2.

Depending from this rim is the body portion and food receptacle 3 of the cooker, the same being constructed of copper, bronze or other rust proof wire mesh, or it may be made of perforated enamel, as preferred.

If the former construction is employed, the mesh-body is soldered or otherwise fixed to the rim. If made in the latter manner mentioned, the body is integral with the rim.

The rim 1 adjacent the body is provided with a plurality of orifices 4, preferably covered from the underside with the wire mesh of the body portion as shown at 5.

If desired, the sustaining rim may itself be formed entirely of the wire mesh formed with the body portion, as shown at 6 in Fig. 3.

Projecting upwardly from the rim and formed therewith is a solid flange 7, on which is adapted to be placed a cover or cap 8.

A bail 9 is mounted to the flange 7, in order that the utensil may be removed from the pot.

This device may of course be made in various sizes to suit different purposes and different sized kettles, the one requisite being that the bottom of the receptacle 3 shall be spaced a certain distance from the bottom of the kettle. In other words, the utensil must be supported by the rim 1 bearing on the kettle, and not by the receptacle resting on the bottom of the kettle.

The receptacle 3 and its coöperating parts may either be sold by itself, or it may be put on the market with a pot or kettle to go with it.

In operation, the food to be cooked is placed in the receptacle, the cover 8 placed on, a suitable amount of water placed in the pot 2, and the utensil then set therein.

The steam generated will escape through the orifices 4, and hence the cover will never blow off, nor the contents ooze out.

Since the lowest layers of food in the receptacle always have water between them and the bottom of the pot, it cannot burn.

When the food is cooked, the receptacle is lifted from the pot, when the water will of course at once drain therefrom without danger of spilling the contents.

It not being necessary to stir the food to keep it from sticking and burning, the same may be kept in a whole condition from its raw state to the table.

From the foregoing description it will be readily seen that I have produced such a device as substantially fulfils the object of the invention as set forth herein.

While this specification sets forth in detail the present and preferred construction of the device, still in practice such deviations from such detail may be resorted to as do not form a departure from the spirit of the invention, as defined by the appended claim.

Having thus described my invention what I claim as new and useful and desire to secure by Letters Patent is:—

A cooking utensil comprising in combination with an open-topped pot, a flat perforated rim adapted to rest on the upper edge of the pot, a freely perforated receptacle depending from the rim into the pot, and spaced therefrom throughout its length, a flange on the rim above the receptacle, and a steam tight cover over the receptacle and removably held by the flange, the latter extending around the inner periphery of the rim.

In testimony whereof I affix my signature in presence of two witnesses.

ROSE PFEFFER.

Witnesses:
R. M. WRIGHT,
N. BERRYESSA.